United States Patent
Gueneau et al.

(10) Patent No.: US 7,510,763 B2
(45) Date of Patent: *Mar. 31, 2009

(54) SUBSTRATE WITH A SELF-CLEANING COATING

(75) Inventors: Lethicia Gueneau, Vincennes (FR); Mauricette Rondet, Vitry sur Seine (FR); Sophie Besson, Paris (FR); Jean-Pierre Boilot, Meudon-la-Foret (FR); Thierry Gacoin, Bures sur Yvette (FR); Clarisse Durand, Paris (FR)

(73) Assignee: Saint-Gobain Glass France, Courbevoie (FR)

(*) Notice: Subject to any disclaimer, the term of this patent is extended or adjusted under 35 U.S.C. 154(b) by 254 days.

This patent is subject to a terminal disclaimer.

(21) Appl. No.: 10/510,714

(22) PCT Filed: Apr. 16, 2003

(86) PCT No.: PCT/FR03/01218

§ 371 (c)(1),
(2), (4) Date: Apr. 29, 2005

(87) PCT Pub. No.: WO03/087002

PCT Pub. Date: Oct. 23, 2003

(65) Prior Publication Data

US 2006/0014050 A1    Jan. 19, 2006

(30) Foreign Application Priority Data

Apr. 17, 2002   (FR) ................................. 02 04775

(51) Int. Cl.
   *B32B 3/26*    (2006.01)
   *B32B 3/14*    (2006.01)
   *C04B 38/00*   (2006.01)

(52) U.S. Cl. .................... 428/307.7; 428/142; 428/144; 428/409; 428/410; 428/701; 427/165; 427/255.11; 427/255.14; 427/255.19; 216/41; 106/2

(58) Field of Classification Search ....................... None
See application file for complete search history.

(56) References Cited

U.S. PATENT DOCUMENTS

| 4,041,194 A | * | 8/1977 | Jenkins ....................... 427/226 |
| 6,103,363 A | * | 8/2000 | Boire et al. ................. 428/325 |
| 6,818,309 B1 | * | 11/2004 | Talpaert et al. .............. 428/432 |
| 6,866,925 B1 | * | 3/2005 | Chane-Ching ........... 428/304.4 |
| 7,144,840 B2 | * | 12/2006 | Yeung et al. ................. 502/350 |
| 2003/0215648 A1 | * | 11/2003 | Varanasi et al. ............. 428/432 |
| 2004/0043260 A1 | * | 3/2004 | Nadaud et al. .............. 428/701 |
| 2004/0197552 A1 | | 10/2004 | Maquin et al. |
| 2006/0014050 A1 | | 1/2006 | Gueneau et al. |

FOREIGN PATENT DOCUMENTS

| CN | 1 342 517 | | 4/2002 |
| EP | 1 132 133 | | 9/2001 |
| FR | 2 827 856 | | 1/2003 |
| JP | 2000-070710 | | 3/2000 |
| JP | 2001-233615 | | 8/2001 |
| JP | 2001-246261 | | 9/2001 |
| WO | WO 9710186 A1 | * | 3/1997 |
| WO | 00/37374 | | 6/2000 |
| WO | WO 0132578 A1 | * | 5/2001 |

OTHER PUBLICATIONS

U.S. Appl. No. 11/579,865, filed Nov. 8, 2006, Gueneau et al.

* cited by examiner

*Primary Examiner*—John J. Zimmerman
*Assistant Examiner*—Aaron Austin
(74) *Attorney, Agent, or Firm*—Oblon, Spivak, McClelland, Maier & Neustadt, P.C.

(57) ABSTRACT

The invention relates to a transparent substrate based on glass or one or more polymers, or a ceramic or glass substrate, or a substrate made of architectural material of the type comprising a wall render, a concrete slab or block, architectural concrete, roof tile, material of cementitious composition, terracotta, slate, stone, metal surface or a fibrous substrate, based on glass of the mineral insulation wool type, or glass reinforcement yarns. This substrate is distinguished in that it is provided, on at least part of its surface, with a coating whose mesoporous structure exhibits photocatalytic properties and comprises at least partially crystallized titanium oxide. Process for manufacturing this substrate, its application in glazing, as architectural material or as mineral insulation wool is also described.

29 Claims, No Drawings

SUBSTRATE WITH A SELF-CLEANING COATING

The invention relates to various types of material that may be found in buildings, vehicles, urban furniture or in domestic electrical appliances, namely in particular:
- transparent substrates, made of glass or polymer, intended to serve as glazing, for example as a display screen;
- ceramic or glass-ceramic substrates that can be used for example in domestic electrical appliances;
- architectural materials, such as roof tiles, floor tiles, stone, cementitious compositions and metal surfaces; and
- fibrous mineral materials, such as glass insulation wool or textile glass yarns, that can be used as filtration material, for making false ceilings, quartz or silica fibers, etc.

Recent studies have been carried out for the purpose of trying to improve the comfort of these materials when in use, especially to make them easier to clean.

In particular, functional coatings having photocatalytic properties have been developed. These are especially coatings comprising $TiO_2$ at least partially crystallized especially in the anatase form, which have for example been described in patents WO 97/10185, WO 97/10186, WO 99/44954 and WO 01/66271. This type of semiconducting material, based on an optionally doped metal oxide (there are also other oxides that can be photocatalytic, such as ZnO, etc), is capable, through the effect of radiation of suitable wavelength, of initiating radical reactions that cause organic compounds to oxidize: this type of coating, when sufficiently exposed to ad hoc radiation (generally ultraviolet, and possibly visible range), is therefore very effective for degrading organic soiling. Furthermore, it has been discovered that, especially when the coatings are based on titanium oxide, they also exhibit a certain hydrophilicity when exposed for a sufficiently long time to said radiation. This coating is therefore very effective in that it can degrade organic soiling and, through its hydrophilicity, remove mineral soiling. However, its activity is dependent on its exposure (for a long enough time) to radiation (of sufficient intensity) of ad hoc wavelength. The behavior of this type of coating therefore depends strongly on the environmental conditions in the case of outdoor exposure, especially the sunshine and rain conditions. Likewise, in the absence of suitable illumination, its activity at night tends to be less than its activity during the day.

The object of the invention is therefore to further improve the functionality imparted by this type of "self-cleaning" or "fouling delay" coatings. The invention is aimed in particular at obtaining coatings that can be of enhanced efficiency and can be more "multipurpose" with regard to various aspects: firstly with regard to radiation exposure conditions, secondly with regard to mechanical stresses (abrasion resistance, etc.) and finally with regard to the combination of other functionalities. The object of the invention is more particularly to obtain coatings that can, even under mediocre irradiation conditions, and even at night, or indoors, in particular under the action of residual ultraviolet radiation from conventional light fittings or of ultraviolet radiation passing through glazing, exhibit a certain antisoiling activity. Products associated with a UV lamp are also the subject of the invention, in particular self-cleaning filters.

The subject of the invention is firstly a substrate that may essentially be transparent, especially one based on glass or one or more polymers, or may be made of a ceramic or glass-ceramic, or may even be an architectural material (of the type comprising a wall render, a concrete slab or block, architectural concrete, roof tile, material of cementitious composition, terracotta, slate, stone, or which may even be a fibrous substrate, based on glass of the mineral insulation wool type, or glass reinforcement yarn, or a product comprising quartz or silica). This substrate is distinguished by the fact that it is provided on at least part of its surface with a coating whose mesoporous structure exhibits photocatalytic properties and comprises at least partially crystallized titanium oxide, especially in anatase and/or rutile form. The term "mesoporous" refers to pores having diameters of between 2 and 50 nm. The mesoporous structure, obtained in the manner that will be described below, is especially based on at least one compound of at least one of the elements Si, W, Sb, Ti, Zr, Ta, V, B, Pb, Mg, AL, Mn, Co, Ni, Sn, Zn, In, Fe and Mo, where appropriate covalently bonded to elements such as O, S, N, C or the like. The at least partially crystallized titanium oxide is, for example, incorporated into the mesoporous structure in the form of perfectly discernable particles. The overall mesoporous structure incorporating the titanium oxide is essentially robust, capable of cohesion and exhibiting excellent mechanical strength and abrasion resistance. The mesoporous structure can be exclusively composed of titanium or of a titanium compound, such as the oxide, especially crystallized in the anatase or rutile form. It turns out that the titanium oxide thus incorporated exerts its photocatalytic activity to an exceptionally high degree. Thus, residual ultraviolet radiation, after having passed through single or double glazing, or residual ultraviolet radiation coming from an interior electrical illumination, is sufficient in respect of the substrate of the invention for it to degrade an organic residue and for this then to be carried away in a relatively uniform liquid film that possibly forms on the substrate made hydrophilic by the radiation. The coating of the invention combines the functionality of photocatalytic degradation of organic residues with the functionality of removing the organic and inorganic residues (hydrophilicity/oleophilicity) through the effect of any liquid, such as condensation liquid. The high performance levels afforded by the invention are perhaps attributable, at least in part, to the interconnection of the pore network, allowing the contamination good accessibility to the titanium oxide particles, and likewise good diffusion of the photogenerated species on the surface of these particles into the coating.

Moreover, the abrasion resistance and the durability of the photocatalytic activity to such a high degree are excellent (see the examples below). The invention therefore also makes it possible to preserve the porosity after abrasion, whereas one might instead have expected that abrasion would consequently densify the surface layer and therefore finally end in a loss of antisoiling properties.

In addition, the mesoporous nature of the substrate makes it possible to envision impregnation thereof, subsequent to the formation of the mesoporous structure, with functional agents such as deodorants, antibacterial agents or any other such agents.

Advantageously, the substrate according to the invention is essentially transparent, flat or curved, of the glazing type, as it is in this type of application that the accumulation of soil preventing visibility is the most irksome and that washing operations are the most necessary in order to guarantee their transparency. This may be glazing with a macroscopic relief, for example pyramidal features with depths of the order of a few millimeters—i.e. impressed glass—, or exhibiting much smaller surface irregularities such as resulting from chemical etching using hydrofluoric acid—i.e. frosted or opacified glass.

Preferably, the coating of the invention is formed with the interposition of a sublayer based on an at least partially oxidized silicon derivative chosen from silicon dioxide, substoichiometric silicon oxides, or silicon oxycarbide, oxynitride or oxycarbonitride. The sublayer proves to be useful when the underlying surface is made of glass, since the migration of alkali metal (sodium) ions from the glass into the coating of the invention may, under certain conditions, impair the photocatalytic properties thereof; in fact the sublayer forms an alkali metal barrier. The sublayer may be of the type described in the aforementioned patent WO 01/32578. Advantageously, it has a refractive index of between 1.45 and 1.80, especially between 1.50 and 1.75, for example between 1. and 1. Such a relatively low index, on a transparent substrate of the glass type, makes it possible to prevent a reflecting effect that may be deemed unattractive.

This sublayer therefore advantageously comprises Si, O, and possibly carbon and nitrogen. However, it may also include materials in a minor proportion compared with silicon, for example metals such as Al, Zn or Zr. The sublayer may be deposited by sol-gel or by pyrolysis, especially by CVD (chemical vapor deposition). The latter technique can be used to obtain $SiO_xC_y$ or $SiO_2$ coatings quite easily, especially by deposition directly on the ribbon of float glass in the case of glass substrates. However, it is also possible to deposit such a coating by a vacuum technique, for example sputtering using an Si (optionally doped) target or a silicon suboxide target (for example in an oxidizing and/or nitriding reactive atmosphere).

This sublayer preferably has a thickness of at least 5 nm, especially a thickness between -10 and -200 nm, for example between -80 and -120 nm.

According to other advantageous features of the substrate of the invention:
  the coating with a mesoporous structure is deposited by a sol-gel method;
  its thickness is between 30 and 800 nm; and
  the titanium oxide incorporated into the mesoporous structure is optionally doped, as explained in patent applications WO 97/10185 and WO 97/10186 incorporated here by way of reference, and comprises nanoparticles with diameters between 0.5 and 100 nm, in particular between 1 and 80 nm, themselves formed from a cluster of elementary grains or crystallites with diameters between 0.5 and 10 nm. The term "diameter" is taken here in the broad sense—it is more of a determination of the size of the nanoparticle or crystallite. The shape of the latter may approach that of a sphere, or else it may have an elongate shape in the form of a rice grain, or a completely random shape.

Another object of the invention is to provide a process for manufacturing a substrate as described above, said process comprising, in succession:
  the preparation of a liquid composition comprising at least one precursor of the material constituting the mesoporous structure of the coating and at least one organic structuring agent;
  the precipitation of the precursor around the organic structuring agent and the growth of molecules derived from the precursor;
  the addition into the Liquid composition of nanoparticles or crystallites—according to the above definition—of optionally doped titanium oxide with diameters between 0.5 and 100 nm;
  the application of the composition to the surface to be coated; and
  the removal of the organic structuring agent, the elementary titanium oxide grains or crystallites being incorporated into the mesoporous structure while essentially preserving their integrity therein, it being possible for several of them to be aggregated therein into clusters. During manufacture of such a substrate, it is not excluded for the titanium oxide grains or crystallites to aggregate with one another and/or grow, especially the smallest among them, depending on the operating conditions (content, pH, temperature, etc.).

For manufacturing the substrate of the invention, the preparation of the liquid composition advantageously comprises:
  preparation of an oxide (especially silica) precursor sol;
  maturing of the sol; and then
  mixing with the structuring agent.

Maturing of the sot allows a preliminary condensation of the oxide precursor, which favors structurization of the oxide coating condensed on the support surface in large domains. Advantageous maturing conditions comprise holding the sol at a temperature between 40 and 60° C. for a time between 30 minutes and 24 hours, the maturing time being shorter the higher the temperature.

In this case, the oxide precursor is advantageously a hydrolyzable compound, such as a halide or alkoxide, and the structuring agent is advantageously chosen from cationic surfactants, preferably of the quaternary ammonium type, such as cetyltrimethyl ammonium bromide, or nonionic surfactants, including dibloc or tribloc copolymers based for example on ethylene oxide or propylene oxide.

The subject of the invention is also the application of the substrates according to the invention, especially those that are essentially transparent, to the manufacture of "self-cleaning" glazing that can provide, simultaneously, antisoiling, antifogging and anticondensation behavior. This may be glazing for buildings, of the double glazing type, vehicle windows of the windshield, rear window, sunroof and side window type. It may also be windows for trains, aircraft and ships. It may also be utilitarian glazing, such as aquarium glass, shop window glass and greenhouse glass, or else glazing used in interior furnishings, in urban furniture or mirrors. It may also be glazing used as display screens of the television, computer or telephone screen type. This type of coating may also be applied to electrically controllable glazing, such as wire-type or layer-type heated windows, electrochromic glazing, glazing incorporating a liquid-crystal film, electroluminescent glazing or photovoltaic glazing.

In the application of the substrate of the invention as glazing (based on glass or transparent plastic), one or more thin layers other than the aforementioned sublayer based on an at least partially oxidized silicon derivative, may be interposed between the support surface and the coating with a mesoporous structure. These may especially be layers with an antistatic function, a thermal function (heating, by providing it with current leads, low-emissivity function, solar-protection function, etc.) or optical function (by reducing the light reflection and/or making the color of the substrate in reflection more neutral, etc.), of an antireflection multilayer stack, etc. As regards such functional layers applied in a known manner to the glazing, optionally in the form of stacks, patent applications WO 97/10186 (already mentioned) and WO 02/02472 are incorporated here by way of reference.

The substrate according to the invention, apart from its application as glazing, may be made of any architectural material that can be used to manufacture partitions, wall claddings, roofing and flooring, for inside or outside (metal, wood, stone, cement, concrete, terracotta, ceramic, watl render, etc.).

The substrate, if instead based on mineral insulation wool, or textile based on glass reinforcement fibers, may serve as filtration material or else may be used for false ceilings, which are not easy to clean.

The subject of the invention is also the application of a woven substrate, a nonwoven substrate (needle-punched mat, felt, wool, etc.), knitted substrate, braided substrate, or block of sintered fibers (known as "rigid silica") based on fused silica fibers with diameters between 1 and 20 μm, on washed glass fibers (more than 90% silica) or alumina and mullite fibers according to claim 1, to the manufacture of anti-odor filters, filters for decontamination of industrial effluents, anti-bacterial filters, filters for indoor decontamination and purification of domestic air, for purification of the passenger compartments of transport vehicles (automobiles, trains, aircraft, ships, etc.), filters for purifying cigarette smoke, filters for purifying domestic electrical appliances (refrigerators, etc.).

The invention will now be described with the aid of non-limiting examples.

EXAMPLE 1

Deposited on glass, still in the form of a ribbon of float glass, was a sublayer based on silicon oxycarbide, denoted for convenience by SiOC (without prejudging the actual oxygen and carbon contents in the coating), the glass being a clear sitica-soda-lime glass 4 mm in thickness such as that sold by Saint-Gobain Glass France under the name Planilux. This sublayer was deposited by CVD using Si precursors, in particular using an SiH4/ethylene mixture diluted in nitrogen, by means of a nozzle placed above and transversely to the ribbon of float glass on a flat glass production line, within the float chamber, when the glass was still at a temperature of about 550 to 600° C. The coating obtained had a thickness of about 50 nm and a refractive index of about 1.55. Cut from the float glass provided with its SiOC alkali-metal barrier sublayer thus obtained were specimens 10 cm×10 cm in size; these specimens were washed, rinsed, dried and subjected to a UV/ozone treatment for 45 minutes.

A coating with a mesoporous structure was formed on the sublayer.

The liquid treatment composition was obtained firstly by mixing 22.3 ml of tetraethoxysitane, 22.1 ml of absolute ethanol and 9 ml of HCl in demineralized water (1.25 pH) until the solution became clear, and then by placing the flask in a water bath at 60° C. for 1 hour.

Secondly, added to the sol obtained above was a solution of cetyltrimethyl ammonium bromide (CTAB) on the one hand, and a solution of a polyoxyethylene/polyoxypropylene block copolymer sold by BASF under the registered trademark Pluronic PE6800 (8000 molecular weight) on the other, in proportions such that the CTAB/Si molar ratio was 0.1 and the PE6800/Si ratio was 0.01. This was obtained by mixing:

0.686 g of CTAB, 20 ml of ethanol and 10 ml of sol; and
3.78 g of PE6800, 50 ml of ethanol and 25 ml of sol.

The $TiO_2$ nanoparticles, crystallized as anatase and approximately 50 nm in size, were added in various proportions to one or other of the two liquid compositions thus obtained, just before deposition on the specimen. The deposition was carried out by spin coating, with a starting amount of 3 ml per specimen. (Other equivalent deposition techniques are dip coating, spraying, laminar coating, roll coating, flow coating, etc.).

The specimens were then subjected to the following annealing treatment:

30 min 100° C., 2 h hold;
15 min 150° C., 2 h hold;
15 min 175° C., 2 h hold;
10 min 200° C., no hold;
3 h 20 min 300° C., 1 h hold; and
2 h 30 min for 50° C., 1 h hold.

The pores of the coating thus formed had a size of 2-3 nm when the cationic surfactant CTAB was employed as structuring agent, this size being 4-5 nm when the copolymer PE6800 was employed as structuring agent.

By SIMS analysis of the coating with a mesoporous structure, it was certified that the Ti/Si atomic ratio was exactly identical to that of the initial Liquid composition. SIMS analysis also confirmed that the nanoparticles were distributed uniformly in the three dimensions of the coating.

The table below gives the various characteristics of the coating at their formation and after 500 cycles of the Opel abrasion test—in the latter case the values indicated are in brackets. The Opel test (Building Standard EN 1096-2 of January 2001) consists in applying, to part of the coated surface 9.4 cm in length (this part being called the track), a felt 14 mm in diameter, 10 mm in thickness and 0.52 $g/cm^2$ in density, under a load of 400 $g/cm^2$, the felt then being subjected to a translational movement (fifty to-and-fro movements over the entire length of the track per minute) combined with a rotation of 6 revolutions/minute (1 cycle=1 to-and-fro movement).

The thickness e (in nm) of the coatings was measured from the SIMS profiles and from the SEM micrographs.

The amount of $TiO_2$ (in $\mu g/cm^2$) was measured by X-ray fluorescence.

The photocatalytic activity was measured in the following manner:

1. the test was carried out on about 15 $cm^2$ of coating;

2. the specimen was weighed and the thickness of the substrate, the light transmission $T_L$ and the haze $H_d$ (both in %) were measured;

3. a palmitic acid solution (8 grams of acid per 1 l of chloroform) were deposited by spraying, with a glass/spray distance of 20 cm, onto the vertical substrate, in 3 to 4 successive passes;

4. the specimen was weighed after deposition of the palmitic acid in order to determine the thickness (in nanometers) of palmitic acid deposited;

5. the light transmission $T_L$ and the haze $H_d$ were measured after deposition;

6. the variation in haze as a function of the UVA irradiation time of approximately 50 $W/m^2$ intensity was measured;

7. the time at which the haze has decreased by 50% was determined graphically: this time is called $t_{1/2\ disappearance}$; and 8. the photocatalytic activity of the coating was evaluated as the rate of disappearance of the palmitic acid v (in nm/h) which is defined in the following manner:

$$v(nm/h) = \text{palmitic acid thickness(nm)} / (2 \times t_{1/2\ disappearance}(h)).$$

Also given in the table below is the value of the photocatalytic activity divided by the amount of $TiO_2$ in the coating. Finally, the optical properties, namely the light reflection $R_L$ and the haze $H_d$ (in %), are indicated.

The test numbers are defined as follows:

1 and 2: CTAB as structuring agent, with Ti/Si=0.1 and 0.25, respectively;

3 to 7: PE6800 as structuring agent, with Ti/Si=0.1, 0.25, 0.5, 1 and 2 respectively.

| Test No. | e (nm) | $TiO_2$ (μg/cm²) | v (nm/h) | v/$TiO_2$ | $R_L$ (%) | $H_d$ (%) |
|---|---|---|---|---|---|---|
| 1 | 214 | 2.2 | 43 | 20 | 6.5 | 0.8 |
|   | (220) | (1.9) | (21) | (11) | (10.2) | (0.5) |
| 2 | 208 | 7.5 | 117 | 16 | 8.7 | 1.1 |
|   | (247) | (5.7) | (114) | (20) | (7.9) | (1.2) |
| 3 | 274 | 4.7 | 47 | 10 | 10.2 | 0.2 |
|   | (209) | (3.4) | (31) | (9) | (7.8) | (0.4) |
| 4 | 308 | 8.0 | 209 | 26 | 12.8 | 0.2 |
|   | (299) | (10.2) | (123) | (12) | (10.2) | (0.3) |
| 5 | 336 | 17.3 | 349 | 20 | 9.7 | 0.4 |
|   | (294) | (14.8) | (181) | (12) | (11.4) | (0.4) |
| 6 | 454 | 33.3 | 620 | 18 | 9.7 | 0.3 |
|   | (184-320) | (28.7) | (354) | (12) | (14.3) | (0.8) |
| 7 | 515 | 66.0 | 684 | 10 | 9.4 | 0.8 |
|   | (209-268) | (46.7) | (...) | (...) | (17.7) | (1.1) |

The thicknesses of the layers varied from 200 to 500 nm depending on the amount of $TiO_2$ nanoparticles incorporated. After 500 Opel cycles, only the thickest (450 and 500 nm) coatings underwent a compaction to more than half of their initial thickness. The photoactivity of these coatings was however tested.

The coatings exhibit photoactivities ranging from 43 nm/h in the case of the coatings structured with the cationic surfactant and the lowest $TiO_2$ concentration (2.2 μg/cm²) to 684 nm/h in the case of the coatings structured with the copolymer and with the highest $TiO_2$ concentration (66 μg/²). The v/$TiO_2$ ratio is always at least equal to 9.

Partial or complete retention of the functionality after 500 Opel cycles is observed, the optical properties also not being impaired except in the case of the thickest layers with the highest $TiO_2$ concentration (Ti/Si=1 and 2)—in the case of the other layers, the $R_L$ and $H_d$ values remain less than 11.4 and 1.2% respectively.

Tests 3 to 7 were repeated (as tests 3' to 7') with low power (1.5 W/m²) UVA irradiation from a conventional illumination lamp; the v (nm/h) and v/$TiO_2$ values recorded are, for the N tests:

3': 0 and 0;
4': 0 and 0;
5': 13 and 0.75;
6': 19 and 0.57; and
7': 28 and 0.42.

The substrate with the coating of the invention is therefore also photoactive under low power UVA irradiation in respect of palmatic acid degradation.

EXAMPLE 2

Disks 47 mm in diameter, 8 mm in thickness and 1000 g/m² in density of needle-punched silica fiber felts, sold by Saint-Gobain Quartz under the name "Needle-punched Quartzel mat" (fiber diameters between 7 and 16 μm) were moreover impregnated by immersion in the composition of the above test No. 6, followed by the heat treatment described above. The increase in mass of the disks thus obtained was 10%.

The ability of these disks to decompose a 350 ppm by volume concentration of methanol in gaseous nitrogen, by filtration with a flow rate of 62.5 ml/mm, under UV illumination (190-350 nm) was tested.

At an illumination power of 48 mW/cm², the efficiency, that is to say the proportion of methanol decomposed, was 100%. At a power of 25.6 mW/cm², it was about 96%, and even about 58% under illumination with as low a power as 8.22 mW/cm².

Thus, the invention makes available a substrate capable of providing the optical transparency quality required in glazing applications and a Lasting self-cleaning functionality under external atmosphere weather and erosion conditions. The remarkably high degree of photocatalytic functionality also makes it possible to envision use at night or indoors by profiting from low-intensity radiation such as that produced by conventional lighting or the passage of solar radiation through glazing, and also effluent or atmospheric decontamination applications, filtration, etc.

The invention claimed is:

1. A substrate, comprising:
   a substrate support; and
   a coating provided on at least part of a surface of the substrate support;
   wherein:
   the substrate support comprises an essentially transparent substrate, a ceramic substrate, a glass-ceramic substrate, an architectural material substrate, or a fibrous substrate;
   the coating has a mesoporous structure and exhibits photocatalytic properties;
   the coating comprises a coating composition and at least partially crystallized titanium oxide incorporated into the coating composition in the form of perfectly discernible particles;
   the coating composition differs in composition from the at least partially crystallized titanium oxide; and
   the substrate is prepared by:
   preparing a liquid composition comprising at least one precursor of the coating composition, and at least one organic structuring agent;
   precipitating the at least one precursor around the at least one organic structuring agent;
   adding the at least partially crystallized titanium oxide to the liquid composition;
   applying the liquid composition to the at least part of the surface of the substrate support; and
   removing the organic structuring agent, thereby forming the coating on the substrate.

2. The substrate of claim 1, wherein:
   the substrate support comprises a transparent substrate is selected from the group consisting of glass and at least one polymer;
   the substrate support comprises an architectural material substrate selected from the group consisting of a wall render, a concrete slab, a concrete block, architectural concrete, a roof tile, a cementitous composition, terracotta, slate, stone and a metal surface; or
   the substrate support comprises a fibrous substrate comprises glass comprising mineral insulation wool, or glass reinforcement yarns.

3. The substrate of claim 1, further comprising a sublayer; wherein:
   the sublayer is interposed between the substrate support and the coating; and
   the sublayer comprises at least one partially oxidized silicon material selected from the group consisting of silicon dioxide, substoichiometric silicon oxides, silicon oxycarbide, silicon oxynitride, and silicon oxycarbonitride.

4. The substrate of claim 3, wherein the sublayer has a thickness of at least 5 nm.

5. The substrate of claim 1, wherein the coating is deposited by a sol-gel method.

6. The substrate of claim 1, wherein the coating has a thickness of between 30 and 800 nm.

7. The substrate of claim 1, wherein the titanium oxide is optionally doped and comprises nanoparticles with diameters between 0.5 and 100 nm, formed from a cluster of elementary grains or crystallites with diameters between 0.5 and 10 nm.

8. The substrate of claim 7, wherein the titanium dioxide is doped.

9. A process for manufacturing the substrate of claim 1, comprising:
preparing a liquid composition comprising
at least one precursor of the material comprising the mesoporous structure of the coating, and
at least one organic structuring agent;
precipitating the at least one precursor around the at least one organic structuring agent;
adding, into the liquid composition, nanoparticles or elementary crystallites of titanium oxide with diameters between 0.5 and 100 nm, wherein the titanium oxide optionally may be doped;
applying the composition to the at least part of the surface of the substrate support-to be-coated; and
removing the organic structuring agent, thereby forming the substrate,
wherein the titanium oxide crystallites are incorporated into the mesoporous structure while essentially preserving their integrity, and
wherein, when crystallites of titanium dioxide are employed in the method, several of the titanium oxide crystallites may be aggregated therein into nanoparticles.

10. The process of claim 9, wherein the titanium dioxide is doped.

11. The process of claim 9, comprising crystallites of titanium oxide.

12. The process of claim 9, comprising nanoparticles of titanium oxide.

13. A method of manufacturing a self-cleaning glazing, comprising:
manufacturing said self-cleaning glazing with the substrate of claim 1,
wherein the self-cleaning glazing is selected from the group consisting of an antifogging glazing,
an antisoiling glazing,
an anticondensation glazing,
a glazing for a building, wherein the glazing for the building is doubled-glazed,
a vehicle window, wherein the vehicle window is selected from the group consisting of an automobile windshield, an automobile rear window, an automobile side window, a window installed on the roof of an automobile, a train window, an aircraft window, and a ship window,
a utilitarian glazing,
an aquarium glass,
a shop window glass,
a greenhouse glass,
an interior furnishing,
urban furniture,
a mirror,
a screen for a display system of a computer,
a television,
a telephone,
an electrically controllable glazing,
an electrochromic liquid-crystal glazing,
an electrochromic electroluminescent glazing,
and a photovoltaic glazing.

14. A method of manufacturing a partition, a wall cladding, a roofing or a flooring, for indoors or outdoors, comprising:
manufacturing the partition, the wall cladding, the roofing or the flooring with the substrate of claim 1.

15. The method of claim 14, wherein the method is a method of manufacturing a roofing.

16. A method of manufacturing a false ceiling or a filtration material, comprising:
manufacturing the false ceiling or the filtration material with the substrate of claim 1,
wherein the substrate comprises mineral insulation wool or glass reinforcement fibers.

17. The method of claim 16, wherein the substrate comprises mineral insulation wool.

18. The method of claim 16, wherein the substrate support comprises glass reinforcement fibers.

19. A method of manufacturing a filter comprising:
manufacturing the filter with the substrate of claim 1,
wherein the substrate is a woven substrate,
a nonwoven substrate,
a knitted substrate,
a braided substrate, or
a block of sintered fibers comprising fused silica fibers with diameters between 1 and 20 µm, on washed glass fibers or alumina and mullite fibers.

20. The substrate of claim 1, wherein:
the substrate support comprises glass or transparent plastic;
the substrate further comprises at least one thin layer interposed between the substrate support and the coating; and
the at least one thin layer has an antireflection functionality.

21. The substrate of claim 20, wherein the substrate support comprises glass.

22. The substrate of claim 20, wherein the substrate support comprises transparent plastic.

23. The substrate as claimed in claim 1, wherein the substrate is essentially a transparent, flat or curved glazing.

24. The substrate of claim 1, wherein the substrate support is an essentially transparent substrate.

25. The substrate of claim 1, wherein the substrate support is a ceramic substrate.

26. The substrate of claim 1, wherein the substrate support is a glass-ceramic substrate.

27. The substrate of claim 1, wherein the substrate support is an architectural material substrate.

28. The substrate of claim 1, wherein the substrate support is a fibrous substrate.

29. A substrate, comprising:
a substrate support made of an architectural material that can be used to manufacture roofing; and
a coating provided on at least part of a surface of the substrate support;
wherein:
the coating has a mesoporous structure and exhibits photocatalytic properties;
the coating comprises a coating composition and at least partially crystallized titanium oxide incorporated into the coating composition in the form of perfectly discernible particles;
the coating composition differs in composition from the at least partially crystallized titanium oxide; and
the substrate is prepared by:
preparing a liquid composition comprising at least one precursor of the coating composition, and at least one organic structuring agent;
precipitating the at least one precursor around the at least one organic structuring agent;
adding the at least partially crystallized titanium oxide to the liquid composition;
applying the liquid composition to the at least part of the surface of the substrate support; and
removing the organic structuring agent, thereby forming the coating on the substrate.

* * * * *